United States Patent [19]
Bishop

[11] Patent Number: 5,468,963
[45] Date of Patent: Nov. 21, 1995

[54] SURVEILLANCE SYSTEM

[75] Inventor: Gary Bishop, Bristol, United Kingdom

[73] Assignee: British Aerospace Public Limited Company, London, England

[21] Appl. No.: 199,887

[22] Filed: May 19, 1988

[30] Foreign Application Priority Data

May 19, 1987 [GB] United Kingdom ............ 8711838

[51] Int. Cl.⁶ ..................... G01J 1/42; G01J 1/20
[52] U.S. Cl. .............................. 250/372; 250/203.3
[58] Field of Search .............. 455/617; 250/203 R, 250/372, 203.3, 203.1

[56] References Cited

U.S. PATENT DOCUMENTS

| | | | |
|---|---|---|---|
| 3,971,943 | 7/1976 | Jeunehomme et al. | 250/372 |
| 4,493,114 | 1/1985 | Geller et al. | 455/617 |
| 4,731,881 | 3/1988 | Geller | 250/372 |
| 4,786,966 | 11/1988 | Hanson et al. | 455/617 |

FOREIGN PATENT DOCUMENTS

| | | |
|---|---|---|
| 984398 | 2/1965 | United Kingdom . |
| 1056620 | 1/1967 | United Kingdom . |
| 1304831 | 1/1973 | United Kingdom . |
| 1466471 | 3/1977 | United Kingdom . |
| 1516281 | 7/1978 | United Kingdom . |
| 1532518 | 11/1978 | United Kingdom . |
| 2020870 | 11/1979 | United Kingdom . |
| 2101352 | 1/1983 | United Kingdom . |
| 2112244 | 7/1983 | United Kingdom . |
| 2112930 | 7/1983 | United Kingdom . |
| 2119985 | 11/1983 | United Kingdom . |
| WO8601301 | 2/1986 | WIPO . |

Primary Examiner—Stephen C. Buczinski
Attorney, Agent, or Firm—Cushman, Darby & Cushman

[57] ABSTRACT

A missile approach warning surveillance system adapted to operate in the ultra-violet ozone absorption waveband.

9 Claims, 1 Drawing Sheet

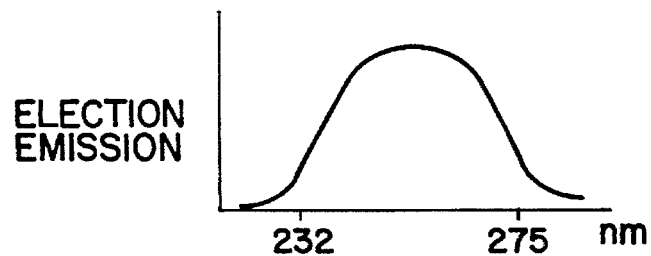
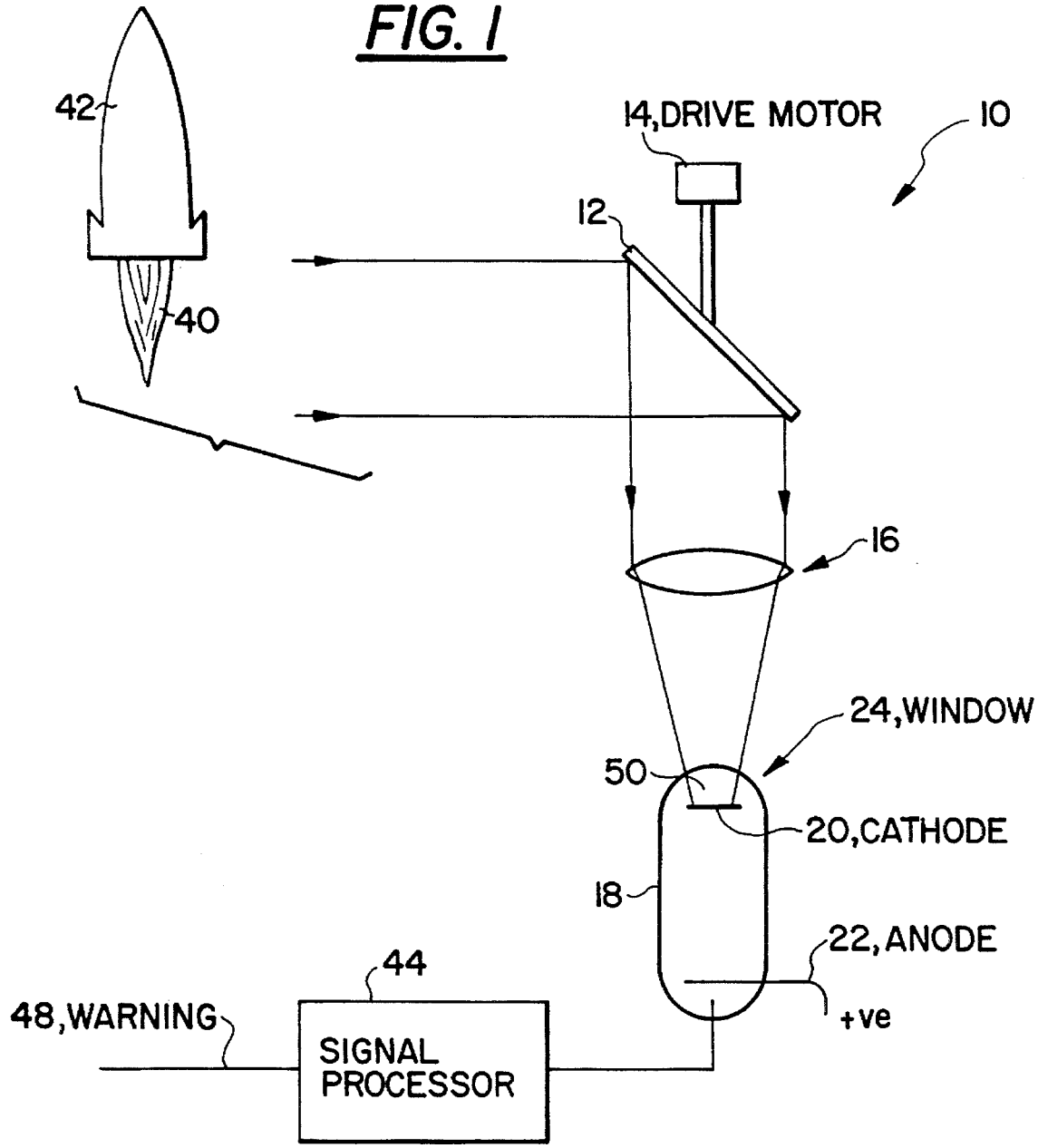

SURVEILLANCE SYSTEM

The present invention relates to a surveillance system particularly, but not exclusively, a missile approach warning system.

Known air mounted missile approach warning systems have a relatively short detection range capability and/or suffer from clutter rejection problems.

According to the present invention we provide a surveillance system adapted to detect radiation having a wavelength which is within the ultra-violet ozone absorption waveband.

In the ultra-violet spectral band there is strong absorption due to atmospheric ozone which consists of a few diffuse bands followed by a very strong continuum which extends from 200 nm to 300 nm. Below 300 nm the radiance from the atmosphere is negligible in comparison with the radiation arriving from the Sun.

The ozone concentration is an order of magnitude lower at sea level than at altitudes between 15 and 20 km and thus the Sun's radiance at sea level is greatly reduced. If therefore the ozone continuum at sea level allows reasonable inband transmission, a detection system could work against a virtually black photon background so that clutter rejection will not be a significant problem.

The sea level solar spectral photon irradiance is less than 1ph/sec/m$^2$/nm for wavelengths between 232 and 275 nm. Hence a system with a hemispherical field of view and a 1 m$^2$ collecting aperture will receive less than 1 photon per second from the Sun in this waveband. For a detection system to be completely solar blind, it must therefore have a filter which rolls off to a stop band with rejection greater than $10^{-18}$ at 315 nm.

Preferably, the system is adapted to detect radiation having a wavelength which is in the range of 232 nm to 275 nm. Within this waveband, line emissions from missile exhaust plumes can be detected.

The solar irradiance at any altitude depends on the optical path length. As the major concentration of ozone is between 10 and 25 km the optical path lengths will not change significantly until the receiver exceeds an altitude of 10 km. Therefore the solar irradiance will not change significantly until the receiver exceeds an altitude of 10 km, with it rising exponentially above this altitude. Therefore an operational ceiling for a UV detection system will be about 10 km.

A UV band detection system will be more sensitive to aerosol concentration than a visible or infra-red system. This is a physical consequence of increased scattering with shorter wavelengths. At altitudes above sea level and up to 10 km (where the atmosphere is cleaner), the detection range will increase. However, above 10 km the ozone concentration increases rapidly and transmission will fall below that at sea level.

In the design of any detection system, one has to consider the magnitude of the emitting sources that the system is designed to detect. The primary source of radiation in this UV waveband will arise from the hot combustion products which occur in rocket exhaust plumes. The radiation from these is primarily of molecular origin; however, electronic levels are excited and give rise to weaker emission in the visible and ultra-violet. Conversely the reaction zone of an exhaust flame may contain high concentrations of electronically excited, middle UV active species.

It is important to provide a sharp cut-off so that only radiation in a predetermined waveband is detected otherwise the system would be swamped by solar radiation. Preferably therefore the system comprises filter means to ensure a sharp cut-off at each end of a selected waveband. The filter means may comprise an input window, e.g. one made from a polymer based substance operable to provide a short wavelength cut-off filter.

An embodiment of the present invention will now be described with reference to the accompanying drawings wherein FIG. 1 is a schematic representation of a surveillance system and FIG. 2 shows the equivalent frequency response of the phototube.

A surveillance system indicated generally at 10 comprises a scanning mirror 12 connected to a drive motor 14 so that it can scan in elevation and azimuth, a telescopic system indicated at 16 and a phototube 18. The phototube 18 comprises a cathode 20 of tungsten and an anode 22 in an evacuated chamber. A small amount of an inert gas may be supplied to the chamber to provide amplification. The front portion 24 of the photodiode 18 is formed from a quartz glass e.g. Corning 9720 or Corning 9700, so as to form a window which will only pass radiation having a wavelength greater than a selected first predetermined value value, say 232 nm.

The tungsten cathode responds only to radiation having a wavelength less than a selected second predetermined value, say 275 nm so that the system 10 operates in the ultra-violet waveband 232 nm to 275 nm as shown in FIG. 2. In use, when a potential is applied between the cathode 20 and the anode 22 and when ultra-violet radiation of this wavelength that is radiation 50 within the ultraviolet ozone absorption waveband, impinges on the cathode 20 e.g. as a result of line emissions from exhaust plumes 40 of a missile 42; electrons are emitted from the cathode 20, and these flow towards the anode 22 thus establishing a signal 46 which is relayed to signal processing components 44 which produces a warning output 48 to indicate same (not shown).

There is amplification of the initial photo-current by ionization of the inert gas. With the correct electrode spacing and gas pressure, avalanche ionization is caused by the emission of a single electron, thus the tube may be configured to have a large amplification.

The short wavelength spectral response depends on the choice of window material for the phototube. Many dyes and polymers and quartz glasses have a rapid change in absorption length with wavelength.

The spectral response of the device at long wavelengths is dependent upon the work function of the metal that forms the photo cathode. The rate at which the response rolls off with increasing wavelength is dependent upon the distributions of valence electrons within the energy levels of the metal. At absolute zero the electrons will occupy those states up to the Fermi level. In this case an electron will not be emitted from the surface unless an incident photon has a wavelength shorter than the cut-off wavelength. Tungsten and Copper with cut-off wavelengths of 273 and 281 nm respectively are considered to be the most suitable cathode metals for this passband. Factors which have to be considered in the cathode design include the effect of temperature on the spectral response and its quantum yield.

A surveillance system of this type may be used in an airborne missile approach warner to provide a look down capability over the battlefield and will not be undermined by clutter since solar sources of ultra-violet radiation in the operating waveband will have been absorbed by the ozone layer. This system therefore has advantages over infra-red systems used for this purpose in which thermal cutter is a major problem.

A surveillance system according to the present invention may be provided with a downward-looking UV-sensor and an upward-looking infra-red sensor.

We claim:

1. A method of detecting the approach of a rocket-driven missile, the method comprising:

using optical apparatus to receive electromagnetic radiation from a field-of-view within which said rocket driven missile may be located; and using detector means to receive, within said radiation, only components associated with a missile exhaust plume and having a wavelength within a predetermined ultra-violet ozone absorption waveband; and detecting the presence of the missile within said field of view when said components are detected.

2. Missile approach warning apparatus comprising:

radiation receiving optical means for receiving electromagnetic radiation from a field-of-view of the optical means within which a rocket-driven missile may be located; and detection means coupled to the optical means for receiving said radiation and for detecting the presence, within said radiation, of only radiation components associated with a missile exhaust plume and having a wavelength within a predetermined ultra-violet ozone absorption waveband to detect said missile within said field of view.

3. A surveillance system for detecting radiation having a wavelength which is within the ultra-violet ozone absorption waveband, said system including:

a phototube having a portion defining a window for admitting into said phototube only radiation having a wavelength above a first predetermined value associated with said ozone absorption waveband;

a cathode located within said phototube for receiving said radiation admitted into the phototube by said window and operable for generating electrons only in response to components of said radiation having wavelengths below a second predetermined value associated with said ozone absorption waveband; and means for detecting said generated electrons to detect said radiation.

4. A surveillance system according to claim 3, further including radiation receiving means coupled to said phototube and operable for scanning a field of view and for directing radiation received from within said field of view into said window.

5. A surveillance system according to claim 3 in which said first predetermined wavelength value is 232 nm.

6. A surveillance system according to claim 3, in which said second predetermined wavelength value is 275 nm.

7. A surveillance system according to claim 3, wherein the window is fabricated from a polymer base material.

8. A surveillance system according to claim 3, wherein the cathode is made of tungsten.

9. A surveillance system according to claim 3, wherein the cathode is made of copper.

* * * * *